April 8, 1924.
J. WHITTEMORE
DRAWING CONTINUOUS SHEET GLASS
Filed April 11, 1921
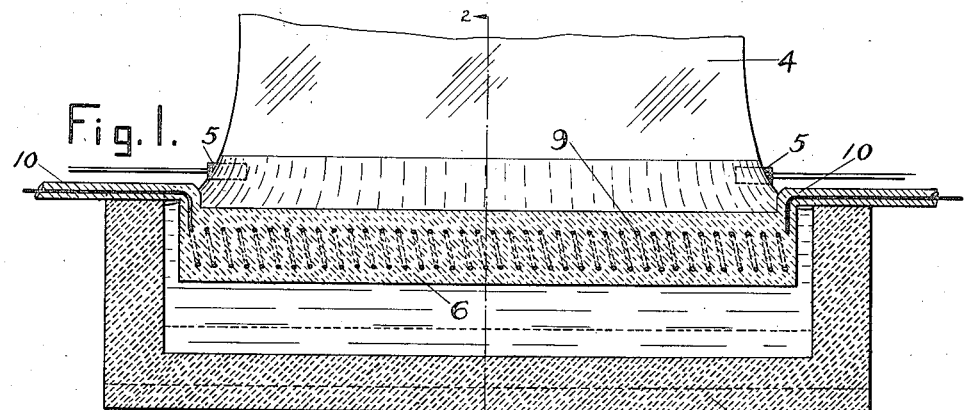
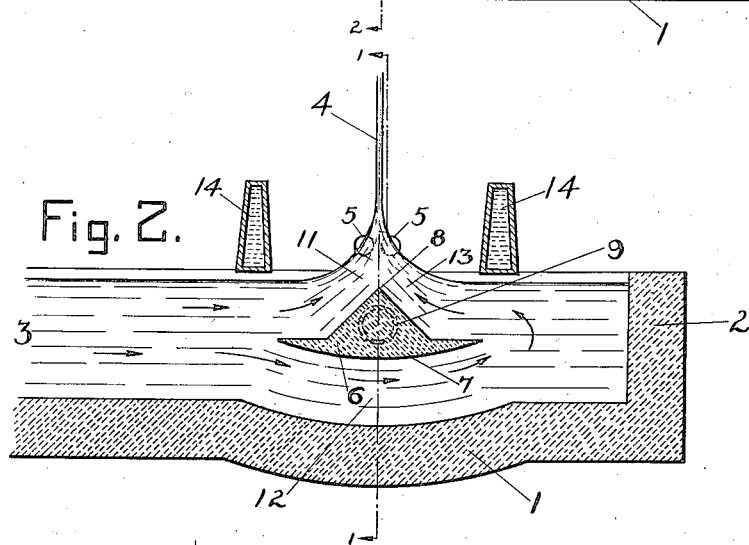
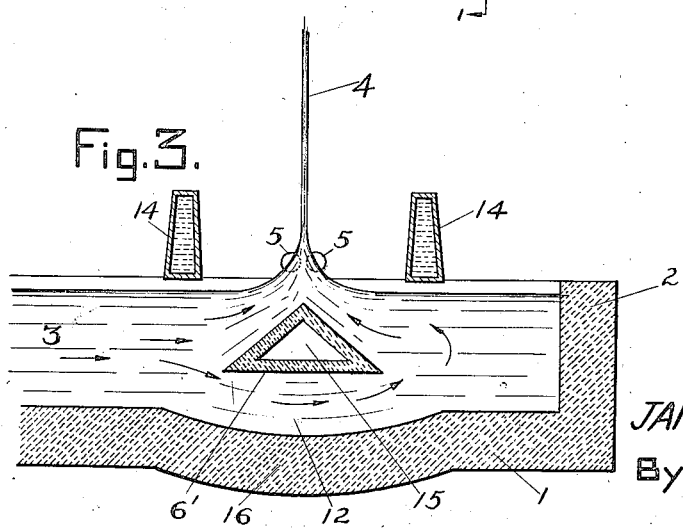
INVENTOR
JAMES WHITTEMORE
By C.A. Rowley
ATTORNEY Patented Apr. 8, 1924.

1,489,875

UNITED STATES PATENT OFFICE.

JAMES WHITTEMORE, OF DETROIT, MICHIGAN, ASSIGNOR TO THE LIBBEY-OWENS SHEET GLASS COMPANY, OF TOLEDO, OHIO, A CORPORATION OF OHIO.

DRAWING CONTINUOUS SHEET GLASS.

Application filed April 11, 1921. Serial No. 460,406.

*To all whom it may concern:*

Be it known that I, JAMES WHITTEMORE, a citizen of the United States, residing at Detroit, in the county of Wayne and State of Michigan, have invented new and useful Improvements in Drawing Continuous Sheet Glass, of which the following is a specification.

This invention relates to a new improvement in the art of continuously drawing glass in sheet form from a mass of molten glass.

One object of the invention is to provide a heater within the molten mass for the glass which goes to form the core or interior of the sheet, so that the pulling stress on this portion of the sheet will be relieved and the outer, cooler surface portions, forming a casing for the sheet, will be stretched taut thus making smoother and flatter surfaces. A further object is to provide a heated partition within the molten glass, beneath the line of generation of the sheet, which will compel equal flows of molten glass into the sheet from both sides thereof. The fact that this partition member is heated will avoid the formation of dog-metal or devitrified glass, which always tends to accumulate around any cool object which is placed within the molten mass. The heated partition will heat the glass in the vicinity thereof and allow a free and unimpeded flow therearound.

The objects and nature of this invention will be more clearly understood from the following detailed description of certain forms of apparatus adapted to carry out the improved process.

In the accompanying drawings;

Fig. 1 is a transverse vertical section through that portion of a glass making apparatus adjacent the drawing point of the sheet, the section being taken substantially on the line 1—1 of Fig. 2.

Fig. 2 is a vertical longitudinal section through the same on the line 2—2 of Fig. 1.

Fig. 3 is a view similar to Fig. 2, showing a different form of heater within the molten glass.

Referring first to Figs. 1 and 2, the draw-pot or receptacle 1, is closed at one end, as at 2, and is in open communication at the other end with a source of molten glass, such as a continuous tank furnace, from which flows a continuous supply of molten glass 3. A sheet of glass 4 is drawn upwardly from the molten glass in receptacle 1, by any desired form of apparatus, neither this apparatus nor the mechanism or parts for subsequently handling and annealing the sheet forming any part of the present invention, which is only concerned with the process of getting the molten glass out of the receptacle into sheet form. Any well-known and practical devices for maintaining the width of the sheet as drawn may be used, sets of edge-holding rolls 5 being illustrated in the drawings. A suitable heating chamber, (not illustrated), will be used about the draw receptacle 1, to maintain the proper temperature of the molten glass therein.

A combined heater and partition 6, of refractory material, is supported within the molten mass 3 below the drawing point of the sheet, with its center line substantially in the same vertical plane as the line of generation of the sheet. This member has a rather wide, and substantially flat or slightly curved lower surface 7, and at its upper side tapers up in wedge form with the edge 8 extending toward the inside of the sheet. Within the refractory member is an electric heater shown conventionally at 9, with the terminals extending out through the supporting brackets 10 for the member 6. Provision may be made to adjust members 10 vertically to vary the position of member 6 within the molten glass.

In any glass drawing receptacle of the type illustrated, when the member 6 is not used, the supply of molten glass to the closed end 2 of the receptacle, beyond the sheet, must obviously flow beneath the surface toward this end since the surface glass is being drawn into the sheet. However, there is a tendency for the greater portion of the upper flow into the sheet to be from the end toward the furnace, from which the glass flows in, thus causing stagnation in the closed end of the receptacle. With the partition 6 in place, the flow of glass 3 from the furnace or tank will be divided by the partition, the upper portion 11, enough to supply half of the sheet, being deflected up along one side of wedge 8 into the sheet, and the remainder passing beneath the partition as at 12, and flowing toward the far end of the receptacle. From there the other half of the sheet is drawn up, as at 13, along the other side of the wedge. The currents of the flowing glass are indicated by the arrows in Figs. 2 and 3. In this manner an even flow of glass from both sides into the sheet is insured. There have been other devices contemplated in former patents, comprising floaters or cooling bars within the molten mass beneath the sheet, which might to some extent cause the glass to flow as outlined above. However, all of these former devices act as coolers, having a tendency to stiffen the glass and impede its flow, and causing a gradual accumulation of dog-metal or devitrified glass therearound. With this improved heated partition, on the contrary, the glass in the vicinity of the partition is heated and softened so that its flowing is facilitated, and devitrification at this point is eliminated.

Furthermore, the glass which flows or is drawn directly over the heated wedge 8 into the sheet, is heated to a much higher temperature, and hence a less viscous condition, than the surface glass, which is cooled by the air above, and by the influence of water-coolers 14, if such be used to allow the sheet to be drawn at a greater speed.

This heating of the interior glass relieves the tension on the core of the sheet, so that the drawing stress is concentrated to a greater degree on the cooled surface portions or casing, stretching the same flat and smooth.

In Fig. 3 is shown a modified form of heater 6', having an interior passage 15 through which heated gases are passed. This member 6' functions in all respects the same as the member 6, already described.

It is to be understood that the exact forms given to the heaters or partitions shown in Figs. 2 and 3 are merely illustrative and might be varied considerably without departing from the scope of this invention. It will be noted that the bottom of the receptacle 1 has been bulged or bellied downwardly at 16, beneath the partition, to provide a deeper passage 12 for the glass flow to the closed end 2 of the receptacle. This feature is not absolutely essential, but permits the use of an otherwise shallower draw-pot or receptacle, without having the member 6 retard the flow of the glass.

Claims:

1. The process of drawing sheet glass from a mass of molten glass, which consists in raising the temperature from within the molten mass of the molten glass which forms the interior portion of the sheet, and simultaneously cooling the surface glass which is drawn into and forms the faces of the sheet.

2. In an apparatus for drawing sheet glass from a mass of molten glass, a heating element located within the molten glass beneath the line of generation of the sheet for heating the glass which is drawn into the interior of the sheet to a higher temperature than that forming the sheet surfaces.

3. In an apparatus for drawing sheet glass from a mass of molten glass, an electrical heating element located within the molten glass beneath the line of generation of the sheet for heating the glass which is drawn into the interior of the sheet to a higher temperature than that forming the sheet surfaces.

4. In an apparatus for drawing sheet glass from a mass of molten glass, a wedge shaped member of refractory material, located within the molten mass with its edge tapering toward the line of generation of the sheet, and a heating device enclosed within the refractory member.

5. In an apparatus for drawing sheet glass from a mass of molten glass, a wedge shaped member of refractory material, located within the molten mass with its edge tapering toward the line of generation of the sheet, and an electric heater enclosed within the refractory member.

6. In an apparatus for drawing sheet glass, a shallow receptacle closed at one end and in open communication with a continuous supply of molten glass at the other, a substantially horizontal partition located within the molten glass beneath the line of draw of the sheet, whereby the flow of glass to the closed end of the receptacle will be below the partition, and the flow of glass into the sheet will be equal from the two sides above the partition, and heating means within the partition.

7. In an apparatus for drawing sheet glass, a shallow receptacle closed at one end and in open communication with a continuous supply of molten glass at the other end, a substantially horizontal partition member within the molten glass, having an upper wedge shaped portion extending up toward the line of generation of the sheet, whereby the flow of glass to the closed end of the receptacle will be below the partition, and the glass will be drawn equally from each side above the wedge member into the sheet, and heating means within the partition.

Signed at Santa Barbara, in the county of Santa Barbara and State of California, this 8th day of March, 1921.

JAMES WHITTEMORE.